United States Patent
Tu

(10) Patent No.: US 9,291,304 B1
(45) Date of Patent: Mar. 22, 2016

(54) SKATEBOARD WALL MOUNT HANGER DISPLAY

(71) Applicant: Lucian S. Tu, Goleta, CA (US)

(72) Inventor: Lucian S. Tu, Goleta, CA (US)

( * ) Notice: Subject to any disclaimer, the term of this patent is extended or adjusted under 35 U.S.C. 154(b) by 0 days.

(21) Appl. No.: 14/678,976

(22) Filed: Apr. 4, 2015

(51) Int. Cl.
*F16M 13/02* (2006.01)
*A63C 17/00* (2006.01)

(52) U.S. Cl.
CPC ............ *F16M 13/02* (2013.01); *A63C 17/0006* (2013.01)

(58) Field of Classification Search
CPC .... A63C 11/028; A63C 11/007; A63C 17/01; A63C 17/017; A63C 17/0006; E05B 73/0094; A47F 7/0028; A47F 7/0021; F16M 13/02
USPC .......... 211/85.7, 70.5, 87.01, 89.01, 86.01, 4; 248/317, 339, 340, 343
See application file for complete search history.

(56) References Cited

U.S. PATENT DOCUMENTS

| | | | |
|---|---|---|---|
| 4,988,007 A * | 1/1991 | Chiarot | A63C 11/028 211/70.5 |
| 5,120,012 A | 6/1992 | Rosenau | |
| 5,193,694 A * | 3/1993 | Wave | A63C 11/028 211/60.1 |
| D342,637 S | 12/1993 | Smith | |
| 5,301,818 A | 4/1994 | Dix | |
| 5,305,897 A | 4/1994 | Smith | |
| 5,316,155 A * | 5/1994 | Collins | A47B 81/005 211/106.01 |
| D354,872 S | 1/1995 | Dix | |
| 5,582,044 A * | 12/1996 | Bolich | B60R 9/08 224/315 |
| D396,371 S | 7/1998 | Oliver | |
| 5,826,908 A * | 10/1998 | McBride | A63C 11/028 211/70.5 |
| 6,196,397 B1 | 3/2001 | Maher | |
| 6,293,412 B1 | 9/2001 | Draper | |
| 6,481,581 B2 * | 11/2002 | Sipe | A47B 81/00 211/4 |
| 6,640,978 B2 | 11/2003 | Reiser | |
| 6,715,653 B2 * | 4/2004 | DeCosta | B60R 9/08 224/324 |
| D499,594 S | 12/2004 | Laitila | |
| 6,942,094 B2 * | 9/2005 | Coulson | A63C 11/02 206/315.1 |
| 7,284,671 B1 * | 10/2007 | Doscher | A63B 1/0036 211/106.01 |
| 7,721,900 B2 * | 5/2010 | Waterman | A47B 81/005 211/70.5 |
| 7,950,535 B1 | 5/2011 | Schmid | |
| 8,540,197 B1 | 9/2013 | Krol, II | |
| 8,939,297 B2 | 1/2015 | Berman | |
| 2002/0030025 A1 * | 3/2002 | Sipe | A47C 81/00 211/4 |
| 2002/0060194 A1 * | 5/2002 | Reiser | A63C 11/028 211/4 |
| 2002/0144962 A1 | 10/2002 | Dettorre | |
| 2004/0108286 A1 * | 6/2004 | Coulson | A47B 45/00 211/85.7 |
| 2008/0083684 A1 * | 4/2008 | Pfeiffer | A63C 11/028 211/85.7 |
| 2012/0006766 A1 * | 1/2012 | Mackay, Jr. | E05B 73/0094 211/4 |
| 2013/0048821 A1 | 2/2013 | Leet | |

* cited by examiner

*Primary Examiner* — Patrick Hawn

(57) ABSTRACT

A skateboard wall mounting device for quickly displaying a bare skateboard deck or a completely assembled skateboard with trucks and wheels attached to the deck. The skateboard wall mounting device generally includes a mounting base, a pair of specific and continuous diameter posts extending from the mounting base and aligned with the deck holes of a skateboard. Due to the specific and continuous diameter design of the posts, the device can accommodate the hanging and mounting of all skateboards from different manufacturers and periods of manufacture without incurring modification and damage to the skateboard.

3 Claims, 12 Drawing Sheets

SKATEBOARD WALL MOUNT HANGER DISPLAY

BACKGROUND OF THE INVENTION

1. Field of the Invention

The present invention relates generally to skateboard deck displays for efficiently mounting a skateboard to a wall.

2. Description of the Related Art

Any discussion of the related art throughout the specification should in no way be considered as an admission that such related art is widely known or forms part of common general knowledge in the field.

Wall mounting devices and solutions for displaying skateboards have been in use for years. A common method of skateboard wall hanging involves two support members (or posts) that extend from a wall and engage the skateboard. One major problem with existing skateboard displays is the design of the support posts do not properly fit in all (100%) of skateboards. In-fact, some existing skateboard wall hangers require drilling larger holes in a skateboard deck in order to mount, thus permanently damaging and devaluing a skateboard. One such skateboard mounting device that does not function as claimed due to a design flaw found with its "T-Nut" design is described within U.S. Pat. No. 7,950,535 entitled "Skateboard Deck Display System". This critical design flaw in some existing wall hanging devices limits its practical functionality to perhaps 50% of skateboards, as standard skateboard holes vary in diameter depending on brand and era of manufacture.

Additionally, there are no existing skateboard wall mounting devices that can hang both bare skateboard decks and completely assembled skateboards (with trucks and wheels) allowing main skateboard graphics and wheels facing forward, thus preferable for wall display.

Because of the inherent problems with the related art, there is a need for a new and improved skateboard wall hanging display that can practically accommodate all (100%) skateboards without resulting in permanently damaging a skateboard.

BRIEF SUMMARY OF THE INVENTION

The general purpose of the present invention is to provide a skateboard wall mounting display device that quickly and efficiently mounts all skateboards regardless of brand without incurring any permanent damage to the skateboard. The present invention can additionally accommodate mounting completely assembled skateboards (with trucks and wheels) with graphics side facing front and many skateboards with varyingly steep nose and tail designs.

The invention generally relates to a skateboard deck display which includes a mounting base, a plurality of posts extending from the mounting base and aligned with the deck holes of a skateboard deck, and a plurality of removable domed security nuts at the distal portion of the posts. The invention's posts are of a specific and continuous diameter allowing the device to mount any standard skateboard regardless of brand or era of manufacture.

There has thus been outlined some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a skateboard deck display device for quickly and efficiently displaying skateboards mounted to a wall.

Another object is to provide a functional design that accommodates all variations of skateboard deck holes.

Another object is to provide a skateboard deck display device that allows skateboards to be easily attached and removed without damage or modification to a skateboard.

A further object is to provide a skateboard display device that provides an anti-theft feature via domed security nuts.

Another object is to provide a skateboard display device that is capable of displaying various sizes, styles, and shapes of skateboards.

A further object is to provide a skateboard display device that can display both a skateboard deck (without wheels) and a completely assembled skateboard (with trucks and wheels).

Another object is to provide a skateboard display device that can be rotated and adjusted on the wall even after mounting allowing further skateboard straightening.

Another object is to provide a skateboard wall display device that mounts a skateboard in an aesthetically pleasing manner.

Another object is to provide a skateboard wall display device that does not interfere with the overall appearance of the skateboards.

Another object is to provide a support base of sufficient mass and stability allowing the wall mounting of heavier and larger skateboards.

The objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1A:
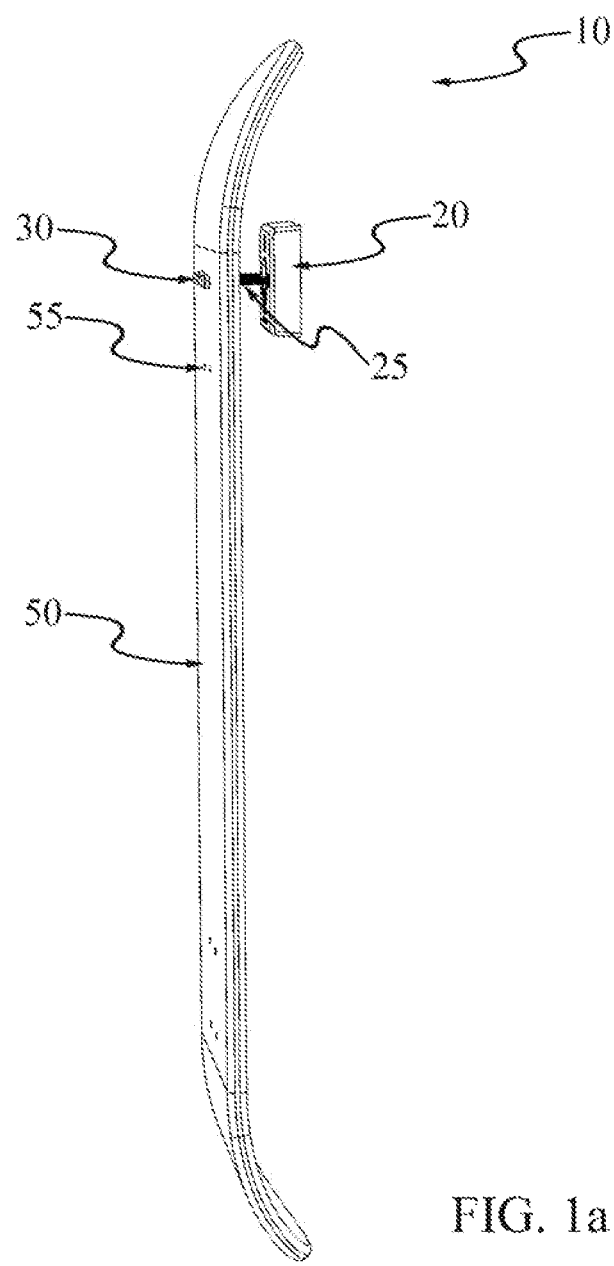
FIG. 1a is an entire perspective view of the preferred embodiment of the present invention showing a wall hanging skateboard.
Figure 1B:
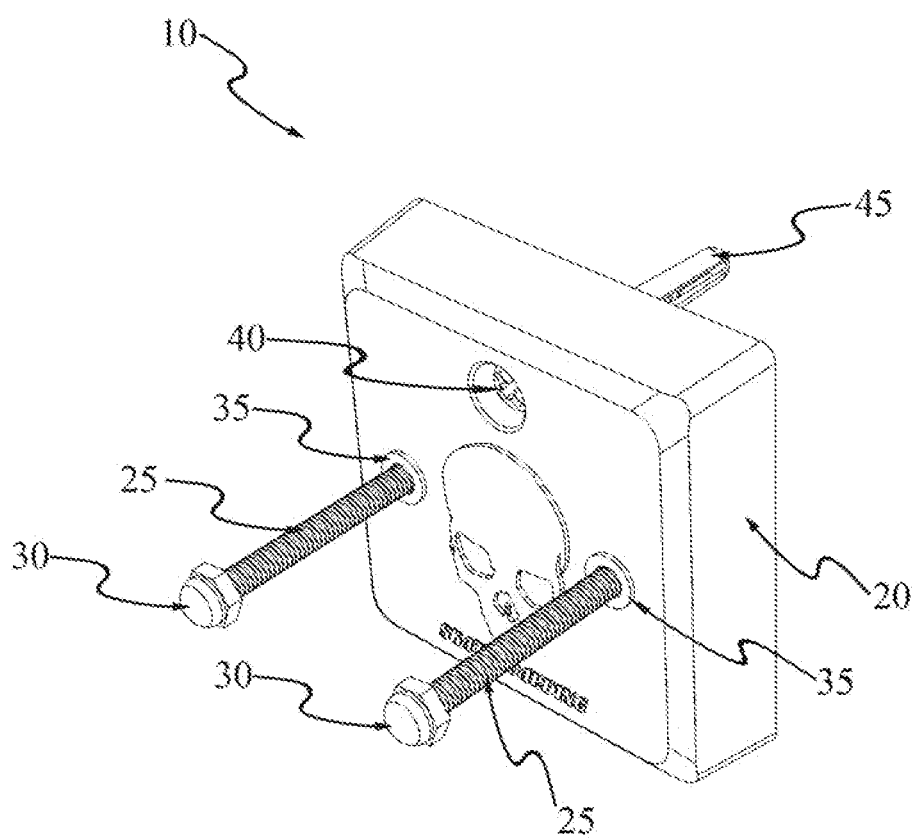
FIG. 1b is an entire perspective view of the assembled preferred embodiment of the invention showing only the mounting invention.

Turning now descriptively to the drawings, in which similar reference characters denote similar elements throughout the several views, FIGS. 1 through 5 illustrate the skateboard wall mounting device 10, which comprises a mounting base 20, a plurality of posts with a specific and continuous diameter 25 extending from the mounting base 20 and aligned with the deck holes 55 of a skateboard 50, and a plurality of removable domed security nuts 30 connected to the distal portion of the posts 25. FIGS. 1a through 4b illustrate an embodiment showing a skateboard deck 50 mounted to a wall by the mounting base 20. FIGS. 5a through 5d illustrate an alternative embodiment wherein a completely assembled skateboard 50, including attached trucks 56 and wheels 57 can be mounted to the wall with the same mounting base 20.

B. Skateboard

FIGS. 1a, 3a, 3b, 4a, 4b illustrate an exemplary conventional bare skateboard deck 50 with holes 55 for mounting trucks 56 and wheels 57. FIGS. 5a through 5d illustrate an exemplary conventional skateboard which is completely assembled including a skateboard deck 50, trucks 56, and wheels 57. Conventional skateboard mounting holes 44 vary in actual diameter depending on manufacturer and era of manufacture. Due to the deck mounting holes 55 not being of consistent diameter in standard skateboards, certain wall mounting devices do not function as claimed.

C. Mounting Base

As best illustrated in FIGS. 1b through 2b of the drawings, the mounting base 20 preferably is comprised of a stable square structure capable of supporting one bare skateboard deck 50 as well as a completely assembled skateboard. The mounting base 20 is directly mounted to the wall by a single wall screw 40. A drywall anchor 45 may be used for additional wall mounting stability.

Figure 2A:
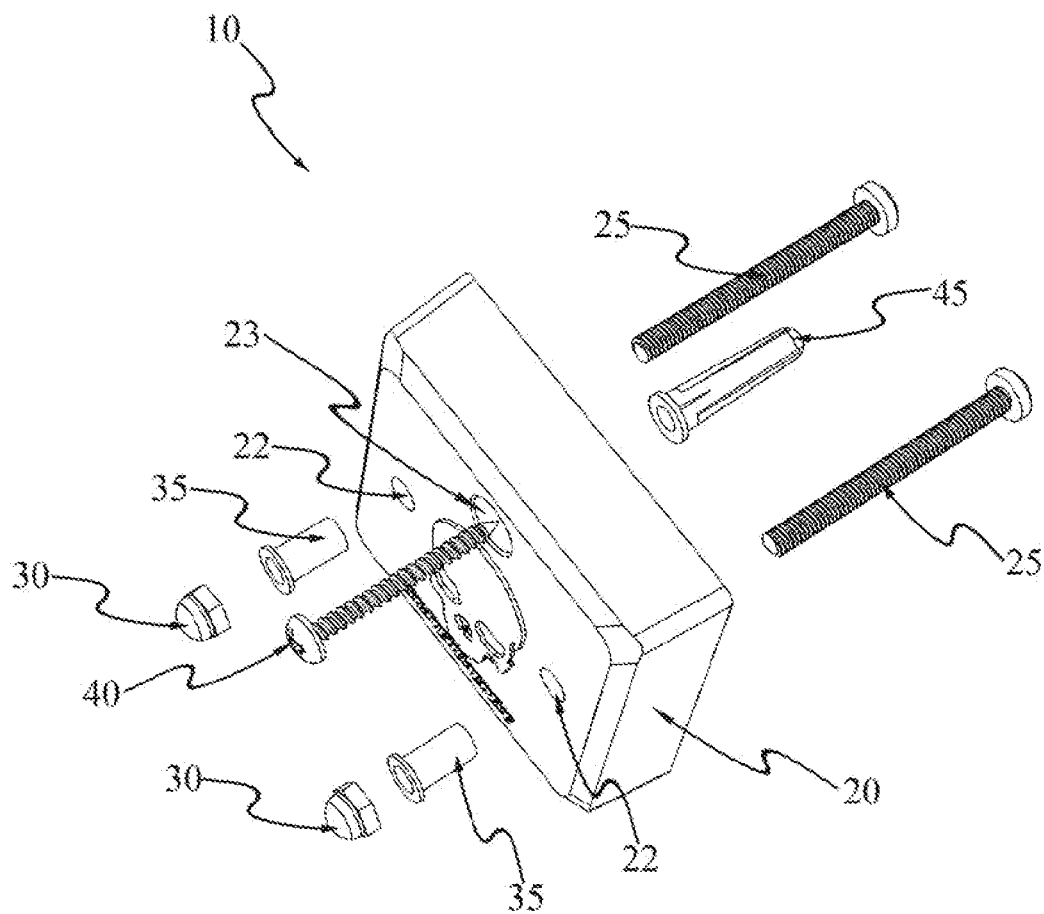
FIG. 2a is an exploded front perspective view of the preferred embodiment of the present invention showing all the components.
Figure 2B:
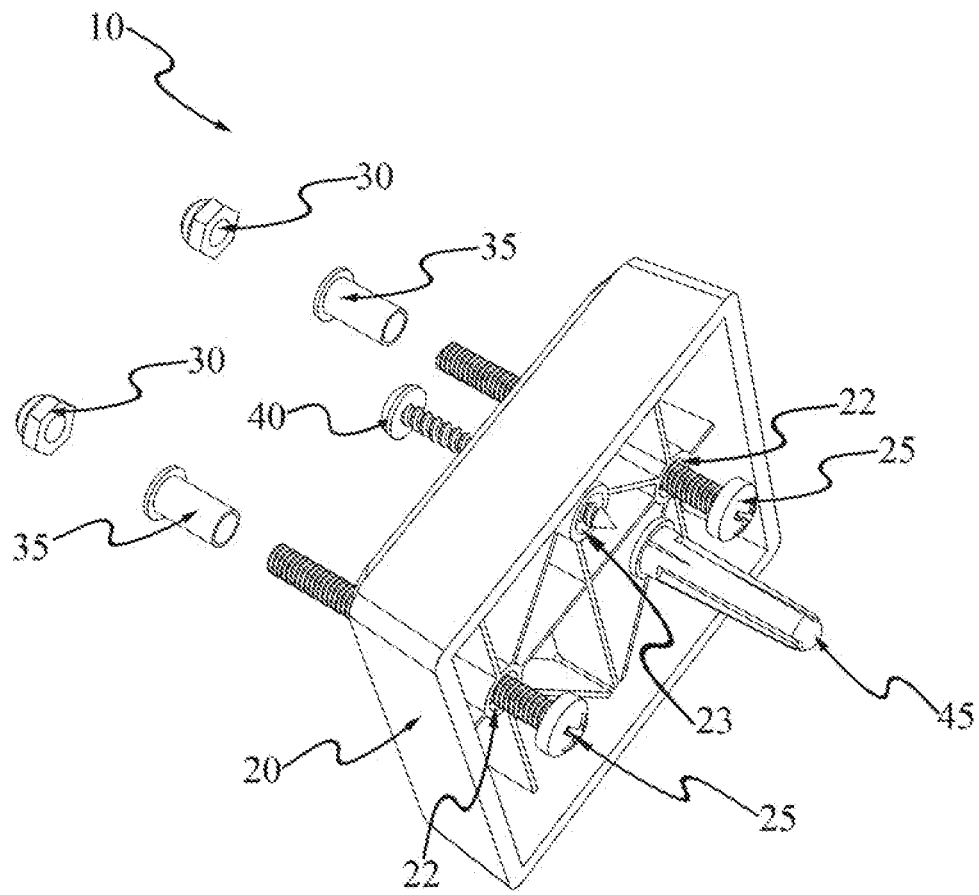
FIG. 2b is an exploded rear perspective view of the preferred embodiment of the present invention showing all the components.
Figure 4A:
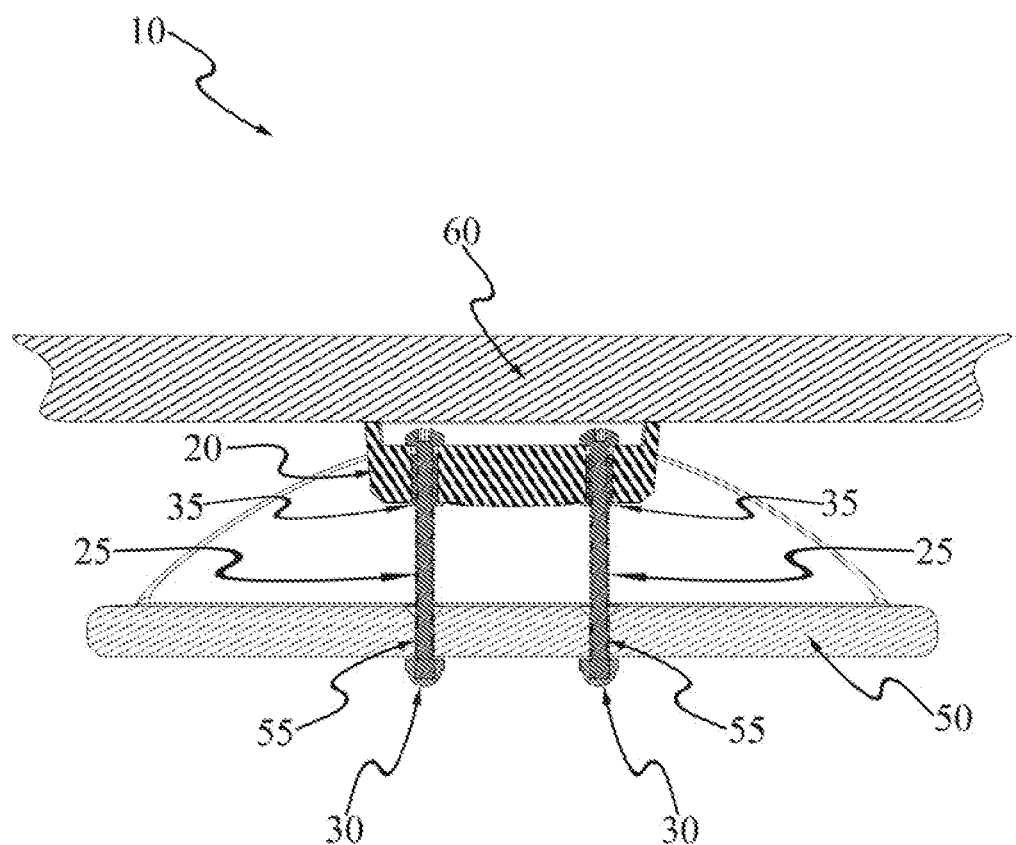
FIG. 4a is a cutaway view of the preferred embodiment showing how the specific and continues diameter of the posts slide through and support a skateboard deck.
Figure 4B:
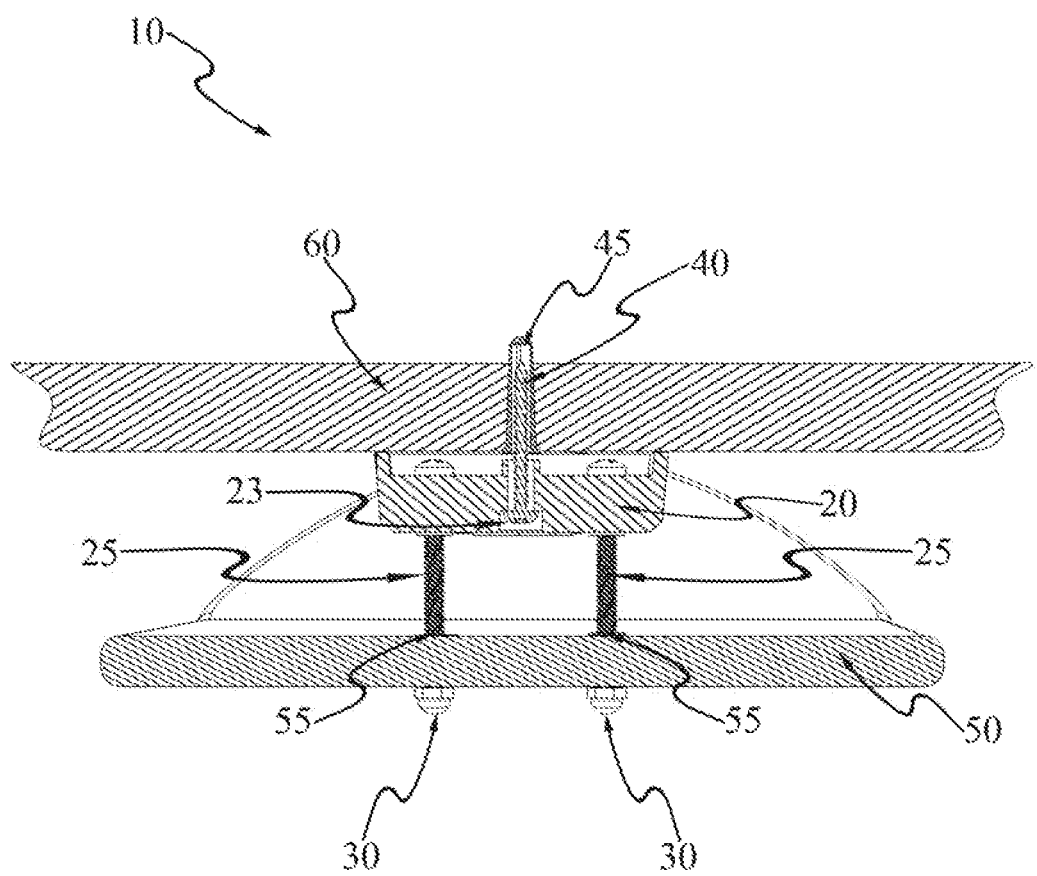
FIG. 4b is a cutaway view of the preferred embodiment showing how the mounting base is attached to a wall.

FIGS. 2a and 2b show the mounting base that contains all the necessary features needed to receive components and assemble into the functioning skateboard wall mounting device 10. The mounting base has a single wall mounting screw hole 23, which allows the mounting base to rotate and adjust a skateboard even after it is mounted to the wall. FIG. 4b illustrates how the single wall screw 40 and single wall mounting hole 23 located toward the top-center of the mounting base 20 allows rotational adjustment of the skateboard while mounted to a wall. This rotational adjustment allows the skateboard to be straightened while still mounted to the wall 60. The mounting base 20 also has a pair of threaded insert holes 22, which allow a pair of posts 25 to extend from the mounting base 20 and insert and slide through existing skateboard 50 holes 55.

D. Posts

As shown in FIGS. 1a through 5d of the drawings, a plurality of posts 25 extend outwardly from the mounting base 20 to support a bare skateboard deck 50 or a completely assembled skateboard consisting of a deck 50, attached trucks, 56 and wheels 57. The posts 25 are of a specific and continuous diameter that is slightly smaller than the smallest diameter of the known range of existing standard skateboard hole 55 sizes.

The pair of posts 25 are preferably substantially concentrically aligned with a pair of deck holes 55 on a skateboard 50, which have consistent standardized center-to-center spacing, unlike actual deck hole 55 diameters, which vary.

The pair of posts 25 with its specific and continuous diameter allows the invention to accommodate all skateboard holes 55 without the need for additional mechanical components along the elongated main axis of the posts 25 or the need to drill larger holes in a skateboard thus permanently damaging and devaluing a skateboard.

E. Threaded Inserts

As best illustrated in FIGS. 1b through 2b of the drawings, a pair of threaded inserts 35 are inserted into the front face of the mounting base 20. The imbedded threaded inserts 35 allow the pair of posts 25 to threadably fasten and tighten into the rear of mounting base 20 and securely extend out the front of the mounting base.

F. Domed Security Nuts

Figure 3A:
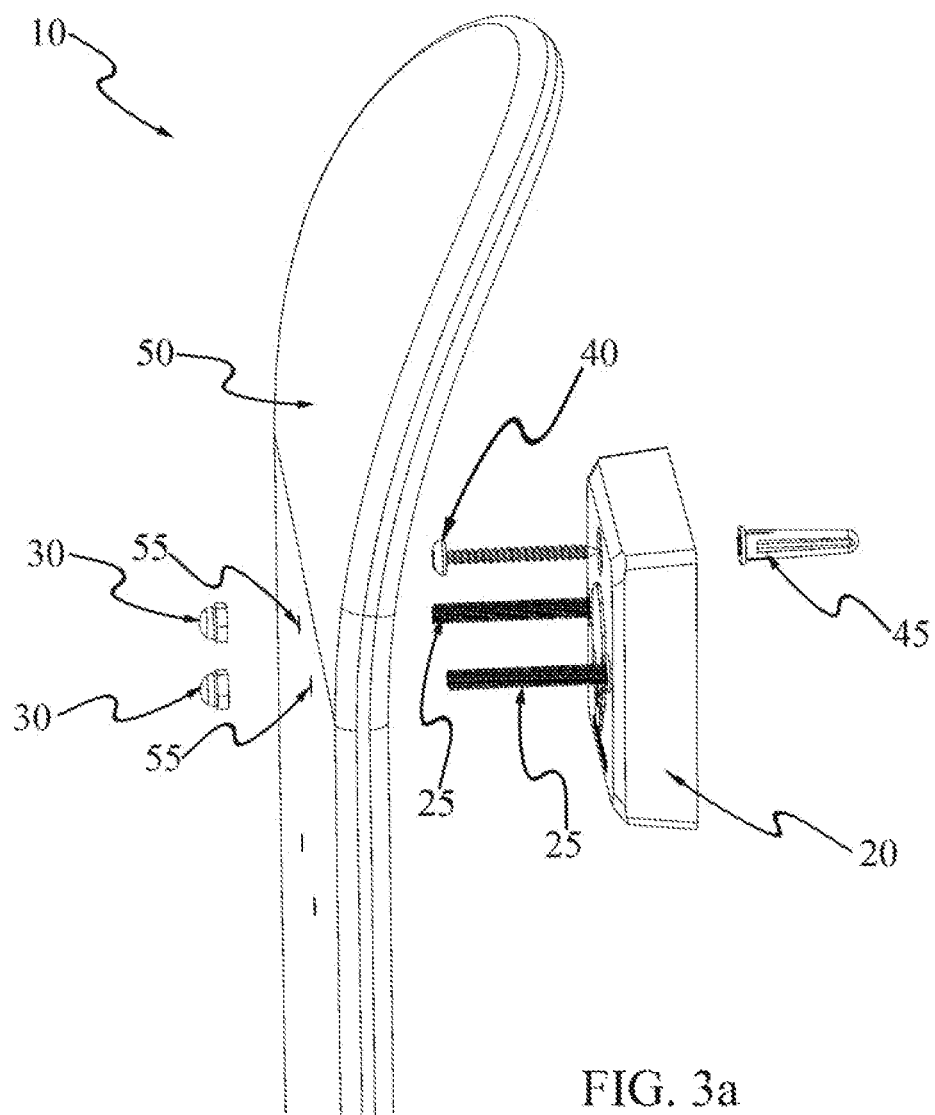
FIG. 3a is a close-up front perspective view of the preferred embodiment of the present invention showing how a skateboard deck attaches through the specific and continuous diameter of the posts.
Figure 3B:
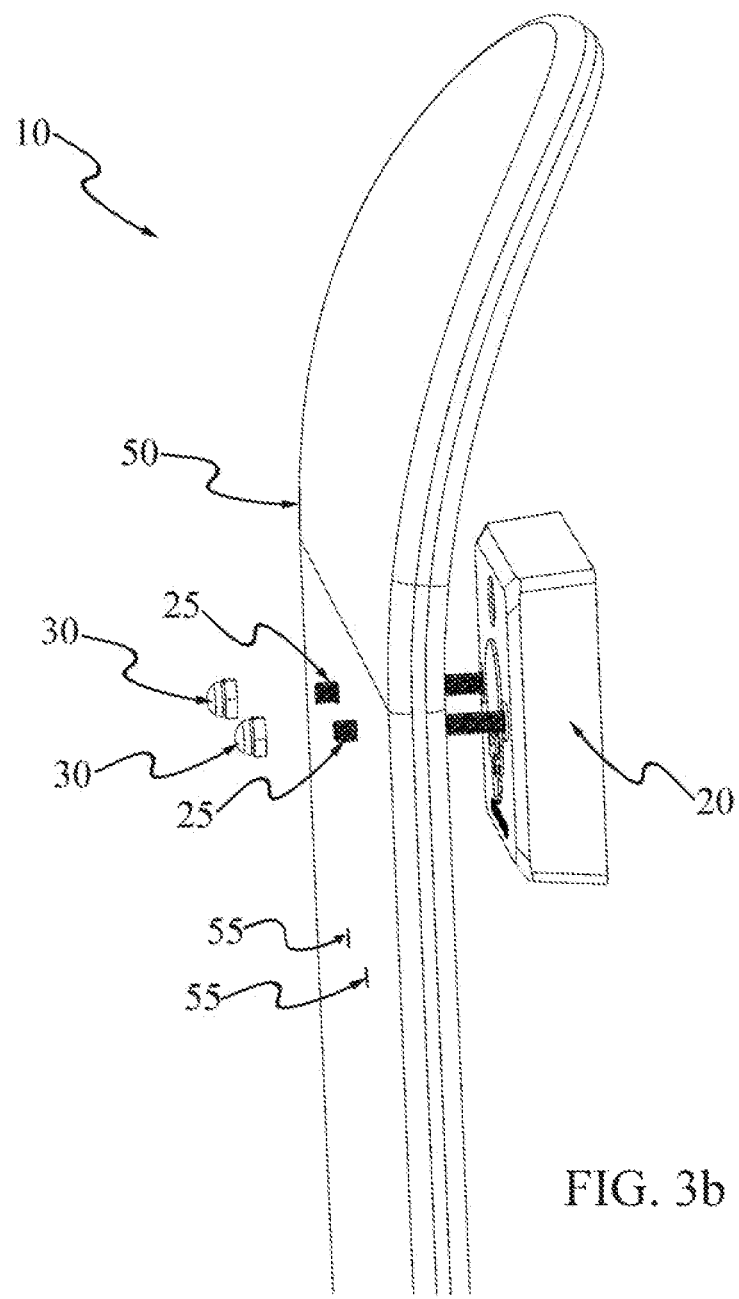
FIG. 3b is a close-up front perspective view of the preferred embodiment of the present invention showing how a skateboard deck slides along the specific and continuous diameter of the posts.

FIGS. 3a and 3b of the drawings show the mounting base 20 assembled with threaded inserts 35, posts 25, and inserted into a skateboard 50 holes 55. The domed security nuts 30 are threadably screwed on to the distal portion of the posts 25 which are inserted and slid through the existing holes of a skateboard. The domed security nuts 30 provide a means for the skateboard to be locked onto the wall as well as provide a finished aesthetic appearance to the distal ends of the posts 25 which are slid through the skateboard holes 55.

G. Completely Assembled Skateboard Mounting

Figure 5A:
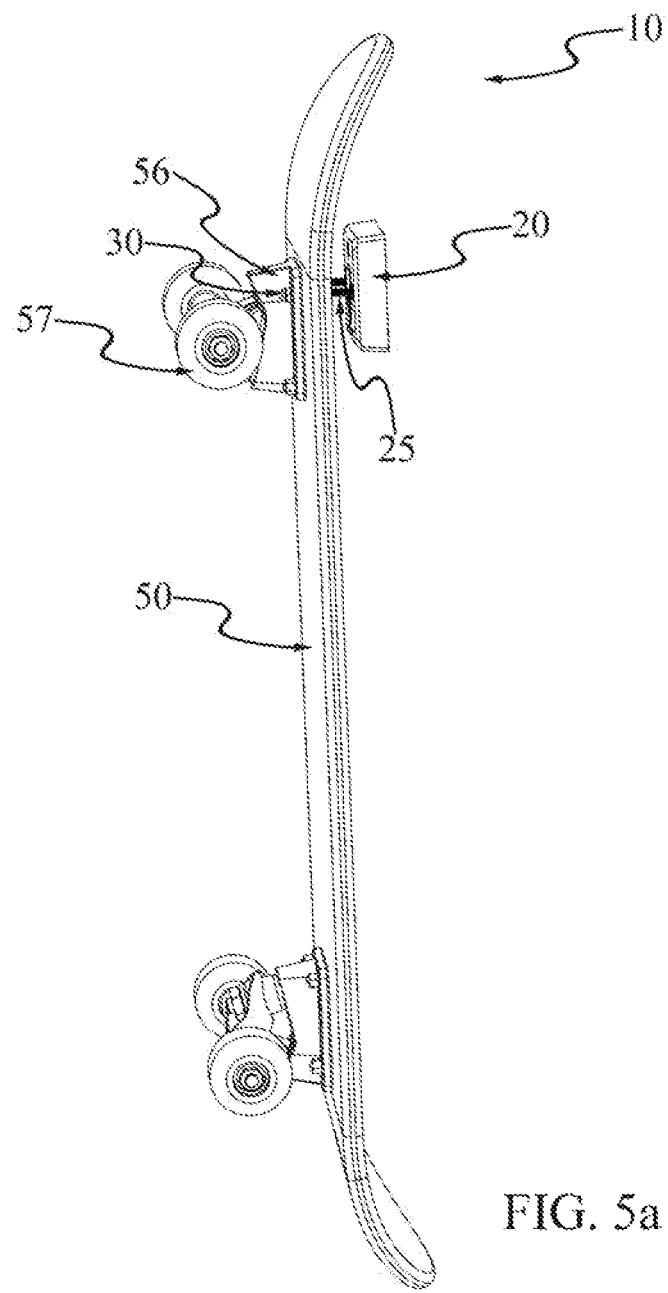
FIG. 5a is an entire perspective view of the alternative embodiment of the present invention showing a completely assembled skateboard hanging on a wall.
Figure 5B:
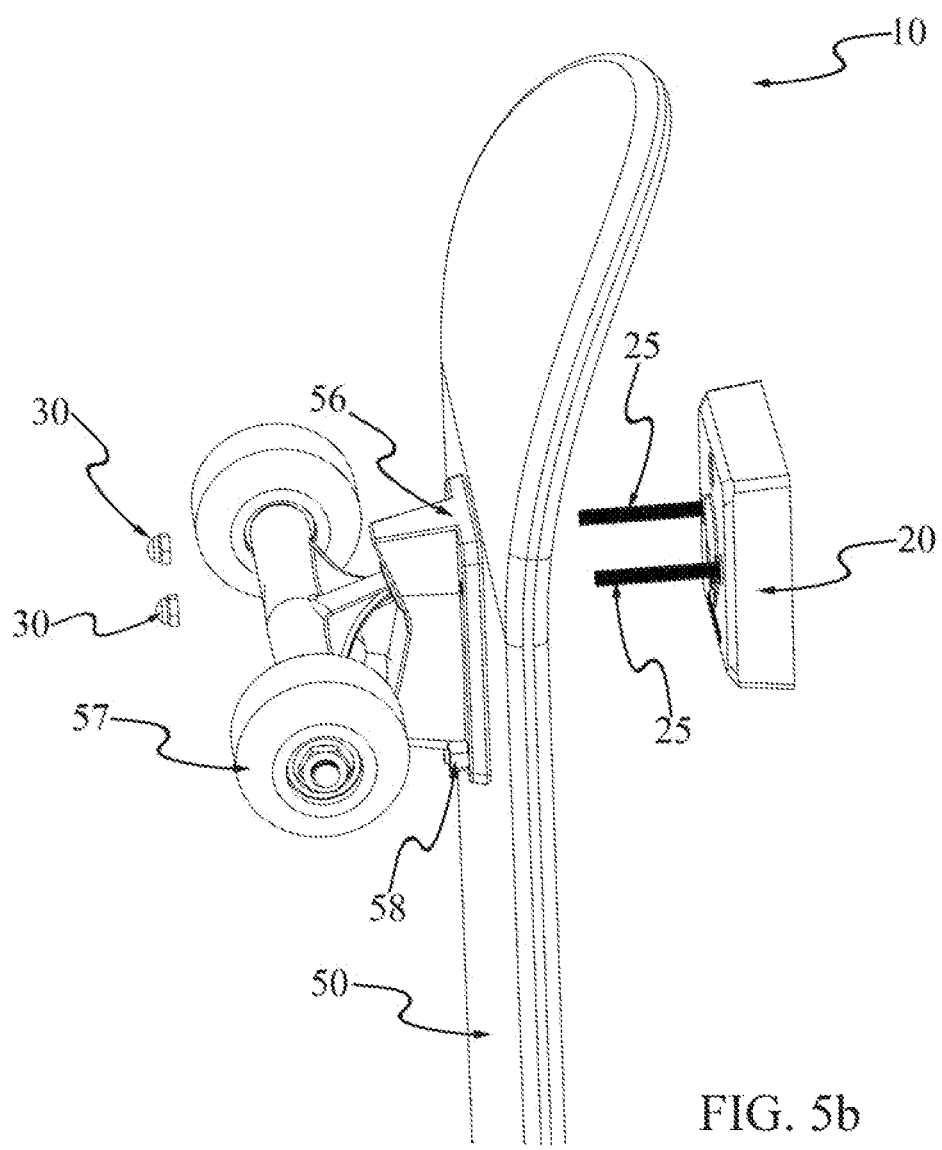
FIG. 5b is an exploded front perspective view of the alternative embodiment showing how a completely assembled skateboard's deck and trucks attach to the specific and continuous diameter of the posts.
Figure 5C:
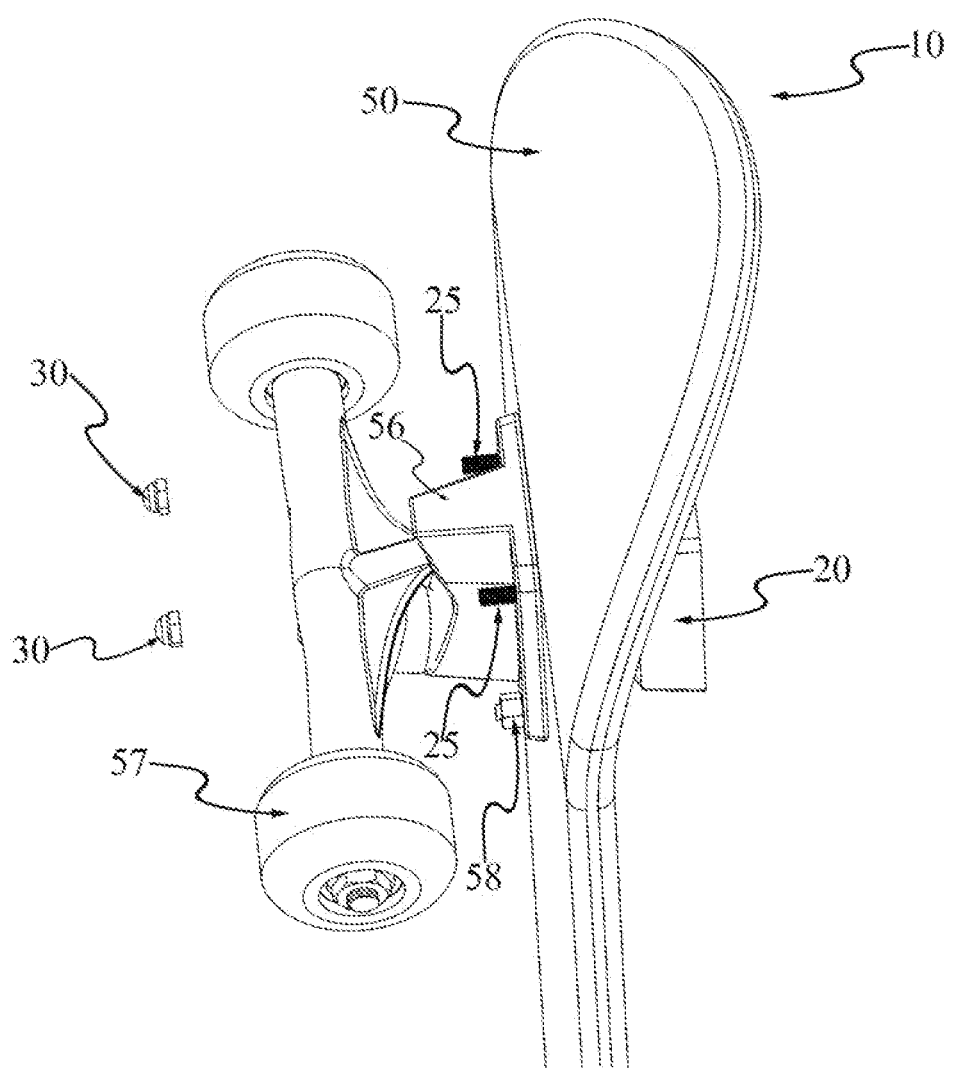
FIG. 5c is perspective view of the alternative embodiment showing a completely assembled skateboard's deck and trucks supported and mounted through the specific and continuous diameter of the posts.
Figure 5D:
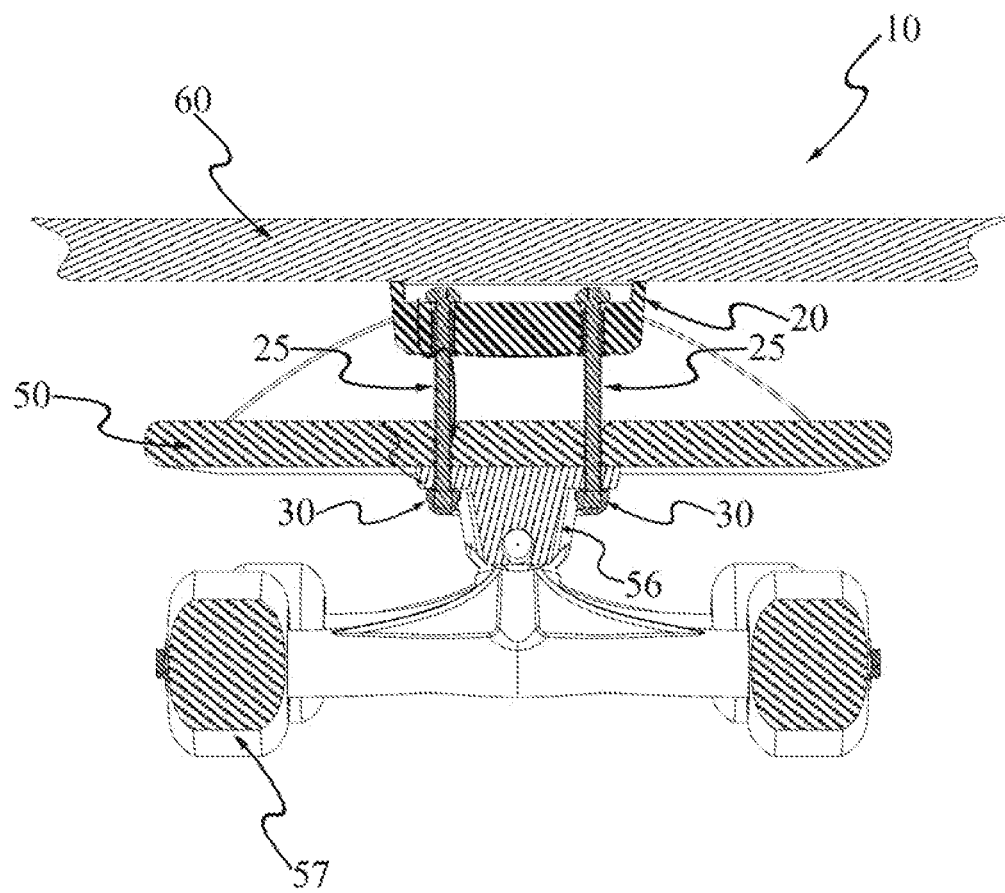
FIG. 5d is a cutaway view of the alternative embodiment showing how the specific and continuous diameter of the posts slide through and support a completely assembled skateboard consisting of a deck, trucks, and wheels.

FIGS. 5a through 5d of the drawings show how the skateboard wall mounting device 10 also hangs a completely assembled skateboard consisting of a deck 50, trucks 56, and wheels 57. In FIG. 5*b*, a pair of existing truck nuts and bolts 58 are simply removed from the attached truck 56 from the deck 50. FIG. 5*c* illustrates how the distal portions of the pair of posts 25 are inserted and slid through the assembled truck 56 and deck holes thus allowing support of a completely assembled skateboard with trucks and wheels. The domed security nuts 30 are then threadably screwed on to the distal portions of the pair of posts 25 thus securing the completely assembled skateboard to the wall 60. FIG. 5*d* illustrates a cutaway view of the skateboard mounting device 10 mounting a completely assembled skateboard with trucks 56 and wheels 57 facing forward in an aesthetically pleasing display configuration.

The invention claimed is:

1. An equipment holding device for mounting skateboards comprising:

a substantially square mounting base including a centrally located mounting hole configured to receive a wall screw for adjustable wall mounting, wherein the mounting base further comprises a hollow core with structural ribbing and two threaded inserts inserted in two apertures on the front of the base;

a pair of threaded posts extending through the threaded inserts in the mounting base and being configured to align with holes of a skateboard, wherein the posts are configured to be smaller in diameter than holes of a skateboard deck and holes of a skateboard truck such that they are capable of passing through both the deck and truck holes without removal of the truck from the deck; and two security nuts attachable to the posts for securing a skateboard.

2. The equipment holding device of claim 1, wherein the mounting base comprises a decorative element.

3. The equipment holding device of claim 1, wherein a wall screw passes through the centrally located mounting hole of the base.

* * * * *